United States Patent
Bones et al.

(10) Patent No.: US 7,260,838 B2
(45) Date of Patent: Aug. 21, 2007

(54) INCORPORATING PASSWORD CHANGE POLICY INTO A SINGLE SIGN-ON ENVIRONMENT

(75) Inventors: Robert Delee Bones, Austin, TX (US); Richard Jay Cohen, Austin, TX (US); Paul Kallfelz, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1312 days.

(21) Appl. No.: 09/740,400

(22) Filed: Dec. 18, 2000

(65) Prior Publication Data

US 2002/0078386 A1 Jun. 20, 2002

(51) Int. Cl.
*H04L 9/32* (2006.01)
*G06F 7/04* (2006.01)
*G06F 17/30* (2006.01)
*G06F 15/16* (2006.01)

(52) U.S. Cl. ............................................. 726/8; 726/6
(58) Field of Classification Search .................... 726/6, 726/8
See application file for complete search history.

(56) References Cited

U.S. PATENT DOCUMENTS

| | | | |
|---|---|---|---|
| 5,684,950 A * | 11/1997 | Dare et al. .................. 713/201 |
| 5,708,777 A | 1/1998 | Sloan et al. ........... 395/188.01 |
| 5,719,941 A * | 2/1998 | Swift et al. .................. 713/155 |
| 5,734,718 A * | 3/1998 | Prafullchandra ............ 713/183 |
| 5,768,503 A * | 6/1998 | Olkin .......................... 713/201 |
| 5,793,952 A * | 8/1998 | Limsico ....................... 713/202 |
| 5,797,128 A * | 8/1998 | Birnbaum ....................... 707/5 |
| 5,819,263 A | 10/1998 | Bromley et al. ............... 707/3 |
| 5,854,629 A * | 12/1998 | Redpath ..................... 345/830 |
| 5,937,159 A * | 8/1999 | Meyers et al. .......... 395/187.01 |
| 5,944,824 A * | 8/1999 | He .............................. 713/201 |
| 6,000,033 A * | 12/1999 | Kelley et al. ............... 713/201 |
| 6,016,146 A | 1/2000 | Beer et al. .................. 345/349 |
| 6,125,457 A | 9/2000 | Crisan et al. ................. 714/36 |
| 6,144,959 A * | 11/2000 | Anderson et al. .............. 707/9 |
| 6,178,511 B1 * | 1/2001 | Cohen et al. ............... 713/201 |
| 6,243,816 B1 * | 6/2001 | Fang et al. ................. 713/202 |
| 7,150,038 B1 * | 12/2006 | Samar ........................... 726/8 |

OTHER PUBLICATIONS

IBM Technical Disclosure Bulletin, "Temporary Global Passwords", Mar. 1993, pp. 451-454 (http://www.delphion.com/tdbs/tdb?o=93A%2060636 Oct. 10, 2000).

* cited by examiner

*Primary Examiner*—Christopher Revak
*Assistant Examiner*—Matthew Henning
(74) *Attorney, Agent, or Firm*—Duke W. Yee; Jeffrey S. LaBaw; Gerald H. Glanzman (57) ABSTRACT

Method, instructions and system for establishing and enforcing change password policy in a single sign-on environment. In response to receiving a change instruction identifying a first single sign-on password, the first single sign-on password is changed to create a second single sign-on password. Then a target password is retrieved. The target password is modified in a user selected manner to match the second single sign-on password to create a modified target password. The modified target password is stored. In response to a request from a user requesting access to an application, the modified target password is retrieved and the modified target password is provided to the requested application.

59 Claims, 6 Drawing Sheets

INCORPORATING PASSWORD CHANGE POLICY INTO A SINGLE SIGN-ON ENVIRONMENT

BACKGROUND OF THE INVENTION

1. Technical Field

The present invention relates generally to the field of computer software and, more particularly, to methods of incorporating a password change policy into a single sign-on environment.

2. Description of the Related Art

As computers have infiltrated society over the past several decades and become more important in all aspects of modern life, more and more confidential information has been stored on a variety of enterprise resources such as NT shared directories, Netware domains, S/390 resources, and protected web server pages. However, computers and networks such as the Internet allow multitudes of users access to these resources. Many times multiple resources may be accessed via the same network, but not all users on the network need or should have access to every resource. Therefore, security devices have been implemented to prevent unauthorized access to specified resources.

One method of preventing unauthorized access is to require the user to provide user identification information to verify that the user is entitled access to specific resources. Thus, many resource manager applications require a user to provide identification information, such as a user ID and password, in order to access protected resources. These applications may have this information fixed within the application (i.e., "hard coded"), the application may be configured with the information, or, in some cases, the application may prompt the user for this information at run time.

However, resource manager applications are not the only computer resources requiring a user to provide identifying information. Other resources such as servers and networks may also require users to provide identifying information. Because different resources have different security requirements and because some resources assign identities rather than allowing a user to choose an identity, many users may have multiple identities depending on the particular resource that they are accessing.

Single-Sign-on (SSO) technology manages this set of multiple identities on behalf of a user so that the user only needs to maintain a single user identity. The user then allows the SSO environment to manage the other identities automatically whenever the user attempts to access a particular protected resource. Some SSO technology stores all of the user's passwords in a centralized database. However, since passwords are confidential, the SSO server uses a "master key" to encrypt the user's passwords before it stores them and it uses the "master key" to decrypt the user's passwords after it retrieves them from the database and before it sends them to the 350 client.

However, when a user wants to change a SSO password, there is no presently available system to allow the user to change all of the user's target passwords with a single operation. In addition, administrators would like to specify a security policy in which the administrator may control when a target password may be changed, as well as what the content of the changed target password should be in relation to the original SSO password. Therefore, a flexible scheme for changing SSO target passwords and a method that supports this scheme in the existing SSO architecture is desirable.

SUMMARY OF THE INVENTION

The present invention provides a method, instructions and system for establishing and enforcing change password policy in a single sign on environment. In response to receiving a change instruction identifying a first single sign-on password, the first single sign-on password is changed to create a second single sign-on password. Then a target password is retrieved. The target password is modified in a user selected manner to match the second single sign-on password to create a modified target password. The modified target password is stored. In response to a request from a user requesting access to an application, the modified target password is retrieved and the modified target password is provided to the requested application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
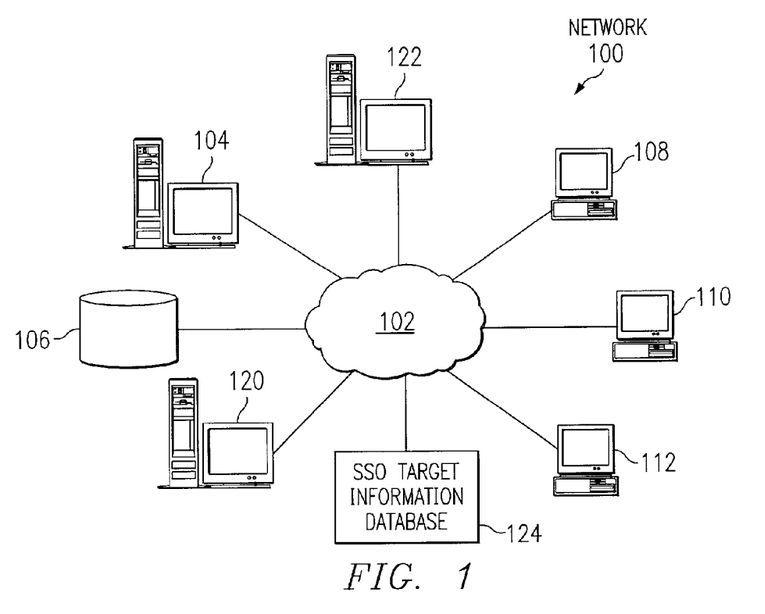
FIG. 1 depicts a pictorial representation of a distributed data processing system in which the present invention may be implemented.

With reference now to the figures, and in particular with reference to FIG. 1, which depicts a pictorial representation of a distributed data processing system in which the present invention may be implemented.

Distributed data processing system 100 is a network of computers in which the present invention may be implemented. Distributed data processing system 100 contains network 102, which is the medium used to provide communications links between various devices and computers connected within distributed data processing system 100. Network 102 may include permanent connections, such as wire or fiber optic cables, or temporary connections made through telephone connections.

In the depicted example, servers 104, 120 and 122, Single Sign-On (SSO) Target Information Database 124, and SSO server 120 are connected to network 102, along with storage unit 106. Of course, Single Sign-On target Information Database 124 may also reside on SSO server 120. In addition, clients 108, 110 and 112 are also connected to network 102. These clients, 108, 110 and 112, may be, for example, personal computers or network computers. For purposes of this application, a network computer is any computer coupled to a network that receives a program or other application from another computer coupled to the network. In the depicted example, server 104 provides data, such as boot files, operating system images end applications, to clients 108-112. Clients 108, 110 and 112 are clients to server 104. Distributed data processing system 100 may include additional servers, clients, and other devices not shown.

In the depicted example, distributed data processing system 100 in an intranet, with network 102 representing a worldwide collection of networks and gateways that use the TCP/IP suite of protocols to communicate with one another. At the heart of the intranet is a backbone of high-speed data communication lines between major nodes or host computers consisting of thousands of commercial, government, education, and other computer systems that route data and messages. Of course, distributed data processing system 100 also may be implemented as a number of different types of networks such as, for example, a local area network (LAN) or a wide area network (WAN). FIG. 1 is intended as an example and not as an architectural limitation for the processes of the present invention.

The SSO Target information database 124 maintains a list of target information for individual users of network 100. The target information contains target data to identify the target as well as a user's userid and password for that target. When a user of the SSO client, such as one of clients 108, 110, or 112 requests to log on to a target, the SSO client first retrieves the users target userid and password from SSO database 124, and "logs on" to the target. The userid and password are decrypted before sending the data back to the SSO client. When a user wants to change a target password, the user's target userid and password are obtained from SSO database 124. The new password is obtained according to a change password policy password source attribute, the target password is changed to the new password, and the new password is stored into SSO database 124. The new password is encrypted before storing it in SSO database 124.

When a user changes his or her SSO password, the change password policy applies, and the results may be retrieved from SSO database 124 for all of the user's target passwords in the form of a list of user target passwords which will be described later in further detail in FIG. 6. Generation of the list of user target passwords at the SSO Server is described in further detail in FIGS. 7, 8, and 9. For each target password in the list of user target passwords, the change password policy is checked, and if the policy specified for that target password is to automatically change that target's password (e.g. PwAutoChg=true), then the password source is checked to determine where to get the new password for that target password. The process of checking to determine where to get the new password is also described in further detail in FIG. 6. If the password source is specified as "Common", then the SSO password is used as the new target password. If the password source is specified as "User Supplied", then the user is prompted for a new password to use as the new target password. If the password source is specified as random, then a random password is generated and used using the password policy appropriate for that type of target. In response to a request to change a first single sign on password, a first SSO password is changed which may trigger the change of a second SSO password depending on the SSO Security Policy.

Figure 2:
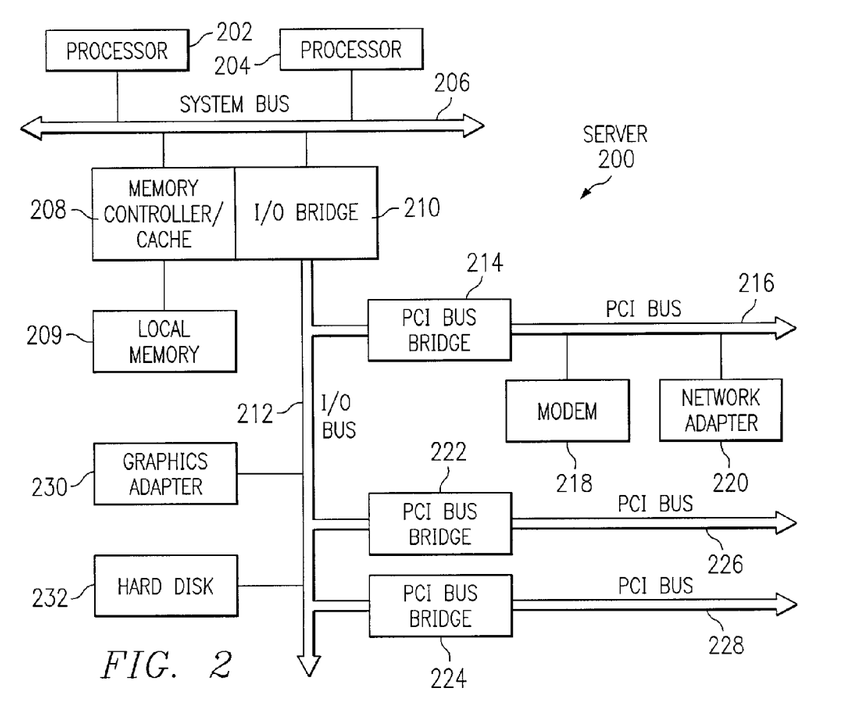
FIG. 2 depicts an exemplary block diagram of a data processing system which may be implemented as a server in accordance with the present invention.

FIG. 2 depicts an exemplary block diagram of a data processing system which may be implemented as a server in accordance with the present invention. Data processing system 200 may be implemented as a server, such as one of servers 104, 120 and 124 in FIG. 1. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems 218-220 may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, server 200 allows connections to multiple network computers. A memory mapped graphics adapter 230 and hard disk 232 may also be connected to I/O bus 212 as depicted, either directly or indirectly. Server 200 may also include a graphical user interface that may be implemented by means of systems software residing in computer readable media in operation within server 200.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RS/6000, a product of International Business Machines Corporation in Armonk, N.Y., running the Advanced Interactive Executive (AIX) operating system.

Figure 3:
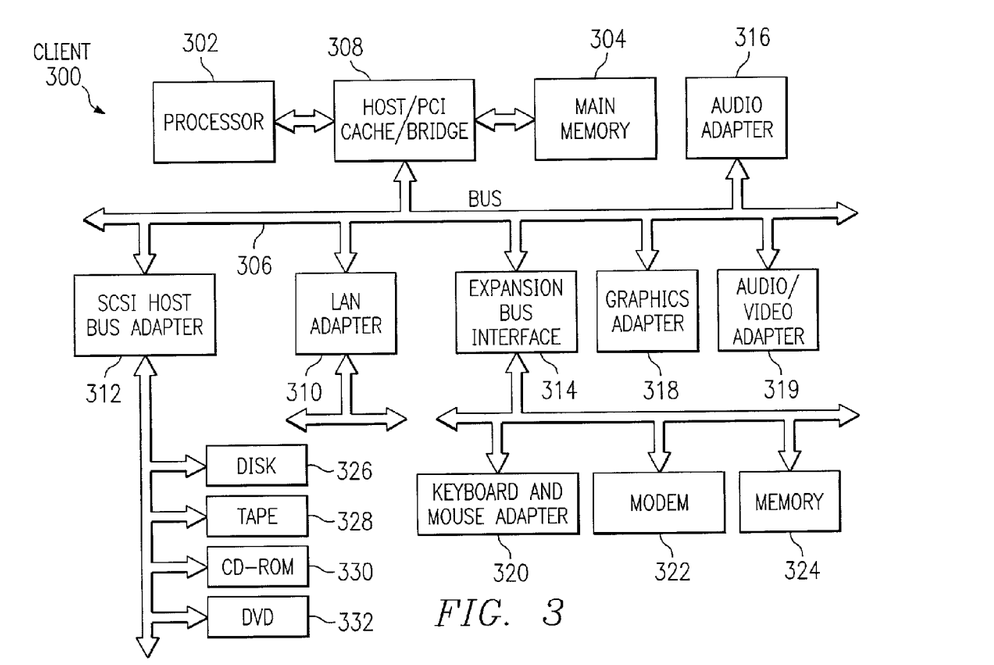
FIG. 3 depicts an exemplary block diagram of a data processing system which may be implemented as a client in accordance with the present invention.

FIG. 3 depicts an exemplary block diagram of a data processing system which may be implemented as a client in accordance with the present invention. Data processing system 300 is an example of a client computer such as one of clients 108, 110, or 112 in FIG. 1. Data processing system 300 employs a peripheral component interconnect (PCI) local bus architecture. Although the depicted example employs a PCI bus, other bus architectures, such as Micro Channel and ISA, may be used. Processor 302 and main memory 304 are connected to PCI local bus 306 through PCI bridge 308. PCI bridge 308 may also include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. In the depicted example, SCSI host bus adapter 312 provides a connection for hard disk drive 326, tape drive 328, CD-ROM drive 330, and digital video disc read only memory drive (DVD-ROM) 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows NT, which is available from Microsoft Corporation. Windows NT is a trademark of Microsoft Corporation. An object oriented programming system, such as Java, may run in conjunction with the operating system, providing calls to the operating system from Java programs or applications executing on data processing system 300. Instructions for the operating system, the object-oriented operating system, and applications or programs are located on a storage device, such as hard disk drive 326, and may be loaded into main memory 304 for execution by processor 302.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The depicted example is not meant to imply architectural limitations with respect to the present invention. For example, the processes of the present invention may be applied to multiprocessor data processing systems.

In a preferred embodiment, setting the global change password policy of the present invention is performed by a system administrator. However, the task of changing password policy is not limited to a system administrator and may be performed by other users of the network system. For example, a system administrator may delegate authority over carrying out password policy to a user of the network system. The processor may receive password change instructions from a system administrator via a pointing device, a keyboard, or other user interface associated with a client device. However, all password policy, including change password policy, is established by a system administrator.

In a preferred embodiment of the present invention, a set of security policies are established which allows an administrator to enforce when a user's target password is changed in relationship to when that user's SSO password is changed. The security policies also specify the source of the new password when the target passwords are changed. The present invention also allows the security policy to be set so that the security policy may use password policy to establish target passwords which may be used for random password generation. A password change policy may be defined by a set of attributes and allowed values for those attributes. The attributes for a password change policy may be:

PwAutoChg—which may automatically change a target password when the single sign-on (SSO) password is changed. This attribute value may be true or false;

PwUserChg—which may allow a user to change a target password. This attribute value may be true or false; and PwSrc—which may specify the valid source for obtaining a new password when a change to the user's target password is made. Valid values for this attribute may be:

Common—which uses the SSO password as the changed target password;

Random—which uses the target password's policy to generate a random password; and User Supplied—which prompts the GSO user for the new target password.

The client authenticates to the server, and once authenticated, the user's target data is requested from the server. The server receives the request, then retrieves the encrypted target data from the SSO Target Information Database. The server then decrypts the data and sends the decrypted data back to the client over a secure Remote Procedure Call (RPC). A RPC is a programming interface that allows one program to use the services of another program in a remote machine. Once the client receives the data, the client may use the data to log into the SSO Targets.

The administrator may choose to edit change password policy, thereby setting the policy which directs the SSO client to automatically change a user's application password when the user changes the user's GSO password. In other words, the administrator sets the change password policy and the change password policy is enforced against a user. If the administrator chooses to edit the change password policy, the administrator may select, for example, one of three password sources and which one of the three password sources may be set as the default password source. Once the password policy is set, then the password policy may be distributed to a SSO endpoint to take effect. There may be a number of ways to manipulate SSO security policy, such as, for example, using a Tivoli Security Management (TSM) interface, which is further illustrated in FIG. 4 and using a SSO Command Line Interface (CLI). Tivoli Security Management is a registered trademark of International Business Machines Corporation in Armonk, N.Y. By using TSM, an administrator creates a security profile with System Policy records in the security profile. SSO Security policy (which includes change password and password policy) may be set in the System Policy record. Once set, that policy record is "distributed" to the SSO Cell endpoint, and then the security policy is set to be used by the SSO client and server which is described in further detail in FIGS. 5-9. By using the SSO CLI, the values are set directly on the SSO Cell, and once set, they may be used by both the client and the server.

Figure 4:
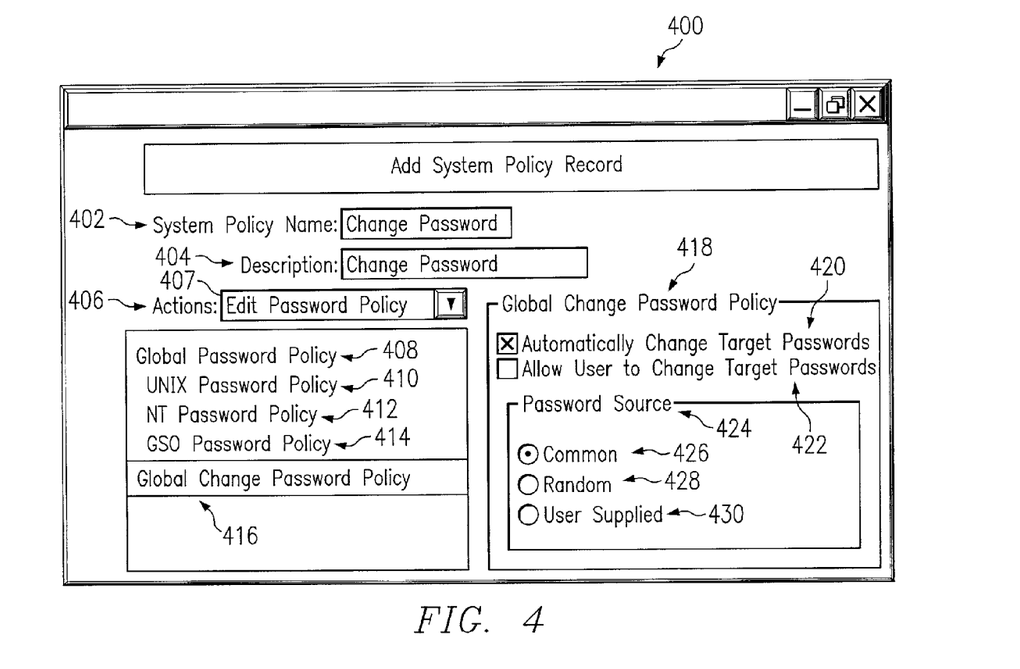
FIG. 4 depicts an exemplary diagram illustrating a graphical user interface for designating the global change password policy in accordance with a preferred embodiment of the present invention.

FIG. 4 depicts an exemplary diagram illustrating a graphical user interface for designating the global change password policy in accordance with a preferred embodiment of the present invention. FIG. 4 illustrates a system policy record menu according to the present invention. Those of ordinary skill in the art will appreciate that the pull down menu depicted in FIG. 4 may vary in appearance and content. FIG. 4 is intended as an example, and not as a functional limitation for the present invention.

In this example, add system policy record screen 400 includes system policy name field 402, description field 404 and actions field 406. System policy name field 402 indicates the specific system policy under examination. Description field 404 allows the administrator to establish a descriptive identifier to be associated with system policy name field 402. The description field provides a place for optional comments about the record. Action field 406 indicates which system policy is being defined or revised. The action field is used to filter the options listed in the edit password policy field 407.

Action field 406 may have a edit password policy field 407. Edit password policy field 407 may consist of global password policy option 408, UNIX password policy option 410, NT password policy option 412, SSO password policy option 414 and global change password policy option 416. The administrator is able to establish the password policies for the system with system policy record screen 400. For example, the administrator may highlight global change password policy 416 and thereby define global change password policy for a user or a group of users. Global change password policy field 418 may be used to indicate the attributes and the values for those attributes in accordance with global change password policy 416.

Global change password policy field 418 contains "automatically change target passwords" option 420 and "allow user to change target passwords" option 422. In addition, password source field 424 contains "common" option 426, "random" option 428 and "user supplied" option 430. The administrator may, using global change password policy field 418 and password source field 424, define the attributes and values for those attributes for global change password policy 416.

Global change password policy 416 may be set for each type of SSO target and may be set at different levels using commands from a command line so that global password change policy 416 may be applied, for example, to an individual user, a set of user's grouped by organization and/or to all SSO users in a SSO cell. Users may be grouped by a security domain known as a cell. A cell may be comprised of a master SSO server and any number of replica servers. Each SSO user may be unique within the cell and each user within a cell may be assigned to an organization. Therefore, organizational level security policy may be applied to only the users associated with that organization. The levels may be set using the commands from the command line. The different levels are cellwide, organization wide, or at the specific user level. By setting global change password policy field 418 appropriately, an administrator may enforce the desired password change policy. For example, if an administrator desired to establish a security policy in order for all of a particular user's passwords to be identical, the administrator may set a Cell Wide password change policy as indicated in FIG. 4 by:

selecting "automatically change target passwords" 420 to true by marking the associated box;

selecting "password source" field 424 to "common" 426 by marking the associated radio button ; and selecting "allow user to change target passwords" 422 to false by not marking the associated box.

Therefore, when a user desires to change his or her SSO password, all of the user's target passwords may be changed to the same password for all target applications. Furthermore, with the administrator selecting "allow user to change target passwords" 422 to false by not marking the associated box, SSO will not allow the user to change his or her target password on the user's own initiative. If the change password policy for a particular target type (e.g. RACF Change Password Policy) is set to be user supplied, and the automatically change target passwords attribute is set to true, then when a user changes his SSO password, then the SSO client will change all that users target passwords, and will provide dialog boxes for each RACF password to allow the user to supply the new password. If the policy is set such that the Password source is set to random on a particular target type (e.g. NT Change password policy), and the automatically change target password attribute is set to true, then when a user changes his SSO password, all of his NT passwords will also be changed to randomly generated passwords.

Figure 5:
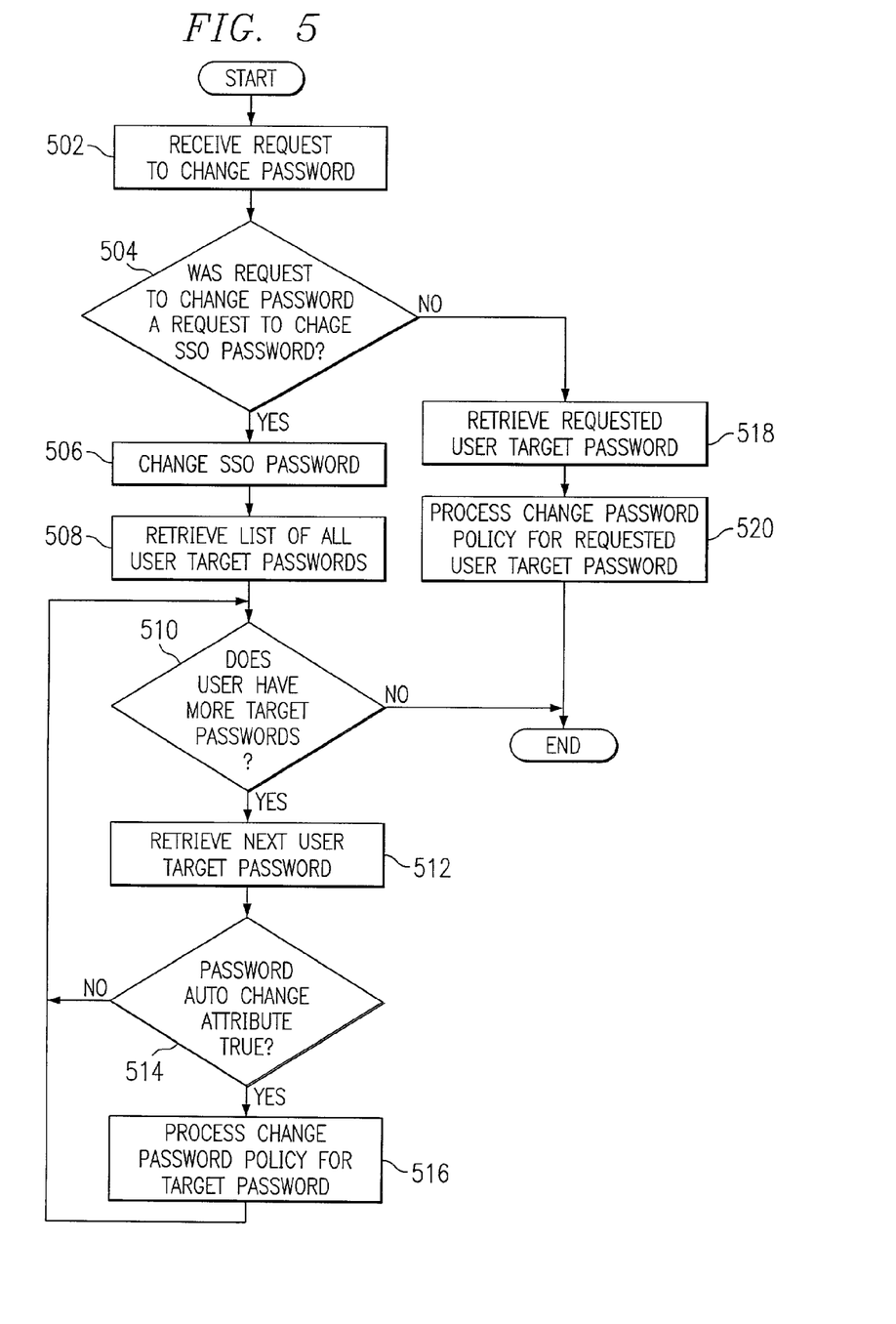
FIG. 5 depicts a flowchart illustrating a method of changing target passwords by applying change password policy in accordance with a preferred embodiment of the present invention.

FIG. 5 depicts a flowchart illustrating a method of changing target passwords by applying change password policy in accordance with a preferred embodiment of the present invention. A target password may be changed or modified by using the present invention. In this example, the operation begins with receiving a request to change a user's password (step 502). A determination is then made as to whether or not the request to change a user's password was a request to change a user's SSO password (step 504). If the request to change a password was a request to change a user's SSO password (step 504: YES), then the SSO password is changed (step 506). Then a list of all user target passwords are retrieved (step 508). A determination is then made as to whether or not the user has more target passwords (step 510). If the user does not have more target passwords (step 510: NO), the operation terminates. If the user does have more target passwords (step 510: YES), then the next target password is retrieved (step 512). Then a determination is made as to whether or not the password auto change attribute is true (step 514). If the password auto change attribute is true (step 514: YES), then the operation returns to step 510 in which a determination is made as to whether or not the user has more target passwords. If the password auto change attribute is not true (step 514: NO), then the change password policy is processed for the target password (step 516) and then the operation returns to step 510 in which a determination is made as to whether or not the user has any more target passwords.

Returning to step 504, where a determination is made as to whether or not the request to change password was a request to change a SSO password. If the request to change password was not a request to change a SSO password (step 504: NO), then the requested user target password is retrieved (step 518). Then the change password policy is processed for the requested user target password (step 520) and thereafter the operation terminates.

Figure 6:
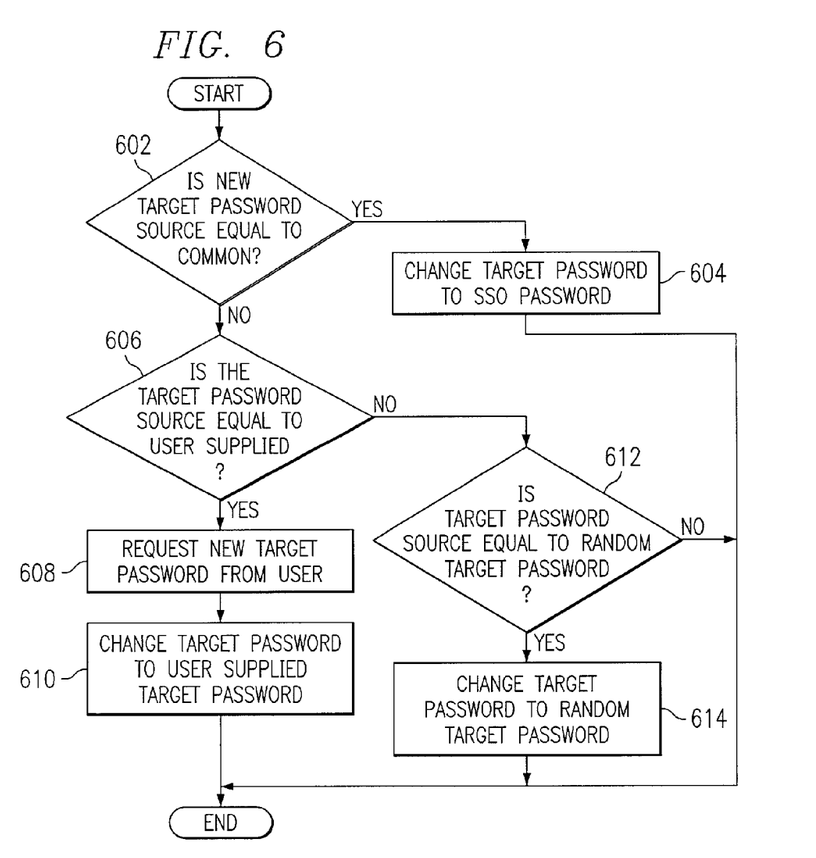
FIG. 6 depicts a flowchart illustrating a process of changing target passwords in accordance with a preferred embodiment of the present invention.

FIG. 6 depicts a flowchart illustrating a process of changing target passwords in accordance with a preferred embodiment of the present invention. FIG. 6 describes in more detail the processing steps 516 and 520 depicted in FIG. 5. In this example, the operation begins with a determination as to whether or not the new target password source is equal to common (step 602). If the new password source is equal to common (step 602: YES), the target password is modified to match to the SSO password (step 604). If the target password source is not equal to common (step 602: NO), then a determination is made as to whether or not the password source is equal to a user supplied target password (step 606). If the password source is equal to a user supplied target password (step 606: YES), then a new target password is requested from the user (step 608). The target password is modified to match the user supplied target password (step 610) and thereafter the operation terminates.

Returning to step 606, if the a determination is made that the target password source is equal to a user supplied target password (step 606: YES), then a determination is made as to whether or not the target password source is equal to a random target password (step 612). If the target password source is not equal to a random target password source (step 612: NO), then the operation terminates. If the target password source is equal to a random target password (step 612: YES), then the target password is modified to match the random target password (step 614), and thereafter the operation terminates.

Figure 7:
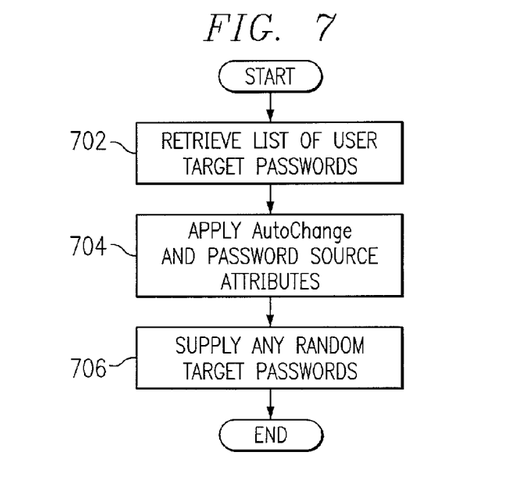
FIG. 7 depicts a flowchart illustrating a process of retrieving a change password list in accordance with a preferred embodiment of the present invention.

FIG. 7 depicts a flowchart illustrating a process of retrieving a change password list in accordance with a preferred embodiment of the present invention. FIG. 7 is an example of a high level algorithm for retrieving a change password list. The SSO client retrieves the change password list from the server, and uses that list to apply the change password policy.

In this example, the operation starts with retrieving the list of user target passwords (step 702). Then the automatic change and target password source attributes are applied (step 704). Then any random target passwords are supplied (step 706), and thereafter the operation terminates.

Figure 8:
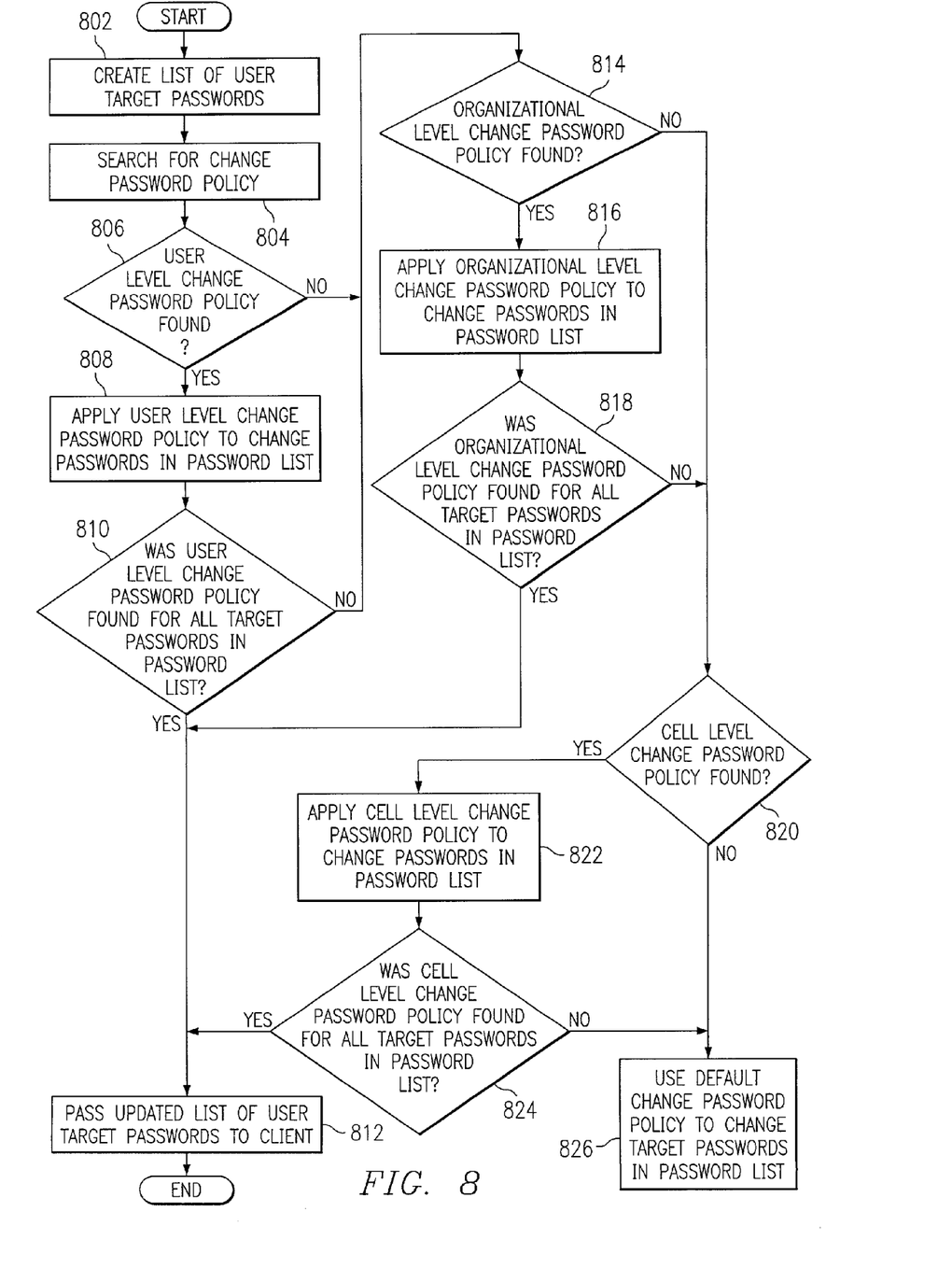
FIG. 8 depicts a flowchart illustrating a process of determining the change password policy in effect for a set of user targets and applying the change password policy attributes found to a list of user target passwords in accordance with a preferred embodiment of the present invention.

FIG. 8 depicts a flowchart illustrating a process of determining the change password policy in effect for a set of user target passwords and applying the change password policy attributes found to a list of user target passwords in accordance with a preferred embodiment of the present invention. FIG. 8 is a more detailed view of step 704 in FIG. 7. In this example, the operation begins with creating a list of user target passwords with an entry for each target in a user's target list (step 802). Then the user level change password policy is searched for (step 804) and then a determination is made as to whether or not the user level change password policy was found (step 806). If the user level change password policy was not found (step 806: NO), then a determination is made as to whether or not an organizational level change password policy was found (step 814). If the user level change password policy was found (step 806: YES), the user level change password policy is applied to change passwords in the password list (step 808). Then a determination is made as to whether or not the user level change password policy was found for all target passwords in the password list (step 810). If the user level change password policy was found for all target passwords in the password list (step 810: YES), then the updated list of user target passwords are passed to the client (step 812) and thereafter the operation terminates. If the user level change password policy was not found for all target passwords in the password list (step 810: NO), then a determination is made as to whether or not an organizational level change password policy was found (step 814).

Whether a user level change password policy was not found (step 806: NO) or the user level change password policy was not found for all target passwords in the password list (step 810: NO), the operation continues with a determination as to whether or not an organizational level change password policy was found (step 814). If an organizational level change password policy was not found (step 814: NO), then a determination is made as to whether or not a cell level change password policy was found (step 820). If an organizational level change password policy was found (step 814: YES), then the organizational level change password policy is applied to change passwords in the password list (step 816). Then a determination is made as to whether or not the organizational level change password policy was found for all target passwords in the password list (step 818). If the organizational level change password policy was found for all target passwords in the password list (step 818: YES), then the updated list of target passwords is passed to the client (step 812) and thereafter the operation terminates. If the organizational level change password policy was not found for all target passwords in the password list (step 818: NO), then a determination is made as to whether or not a cell level change password policy was found (step 820).

Whether the organizational level change password policy was not found (step 814: NO) or the organizational level change password policy was not found for all target passwords in the password list (step 818: NO), a determination is made as to whether or not a cell level change password policy was found (step 820). If a cell level change password policy was not found (step 820: NO) then the operation continues to using a default change password policy to change passwords in the password list (step 826) and thereafter the operation terminates. If a cell level change password policy was found (step 820: YES), then the cell level change password policy is applied to change passwords in the password list (step 822). Then a determination is made as to whether or not the cell level change password policy was found for all target passwords in the password list (step 824). If the cell level change password policy was found for all target passwords in the password list (step 824: YES), then the updated list of user target passwords is passed to the client (step 812) and thereafter the operation terminates. If the cell level change password policy was not found for all target passwords in the password list (step 824: NO), then a default change password policy is used to change target passwords in the password list (step 824) and thereafter the operation terminates.

Therefore, any level where the change password policy is found, that policy is applied to any target password entries in the password list that the change password policy applies to. For example, User A has, for example, three targets, a RACF target, an NT target, and a Netware target. A change password policy is set at the user level for user A for NT targets. Assume further that no change password policy is set at the organizational level, and a change password policy is set at the cellwide level for RACF targets. Therefore, the Password Auto Change (PwAutoChg) attribute is set to "TRUE" in the User level change password policy for NT and in the RACF policy at the cell level. Also, the default policy is enabled. A password list may be constructed with entries, for example:

a RACF target a NT target a Netware Target

In this example, the user level change password policy would be searched for first, the user level change password policy would be found and applied to the NT target. At this point, a determination is made that all the targets in the password list have not been processed, therefore the operation continues. Next an organizational level change password policy is searched for. However, in this example, an organizational level password policy is not found. Since there remains the determination that all of the targets in the password list have not updated, a cell level change password policy is searched for. The cell level change password policy is found and apply it to the password list At this point, the NT target and the RACF target have been processed. However, all the targets in the password list have not been processed. Therefore, the default change password policy is applied to all the targets that are unprocessed in the password list, which is in this example, only the Netware target. The default change password policy is applied to the Netware target and, since it is now determined that all target passwords in the password list have been processed, the list of user target passwords is passed back to the client to use in the algorithm described in FIG. 6 and thereafter the operation terminates.

Figure 9:
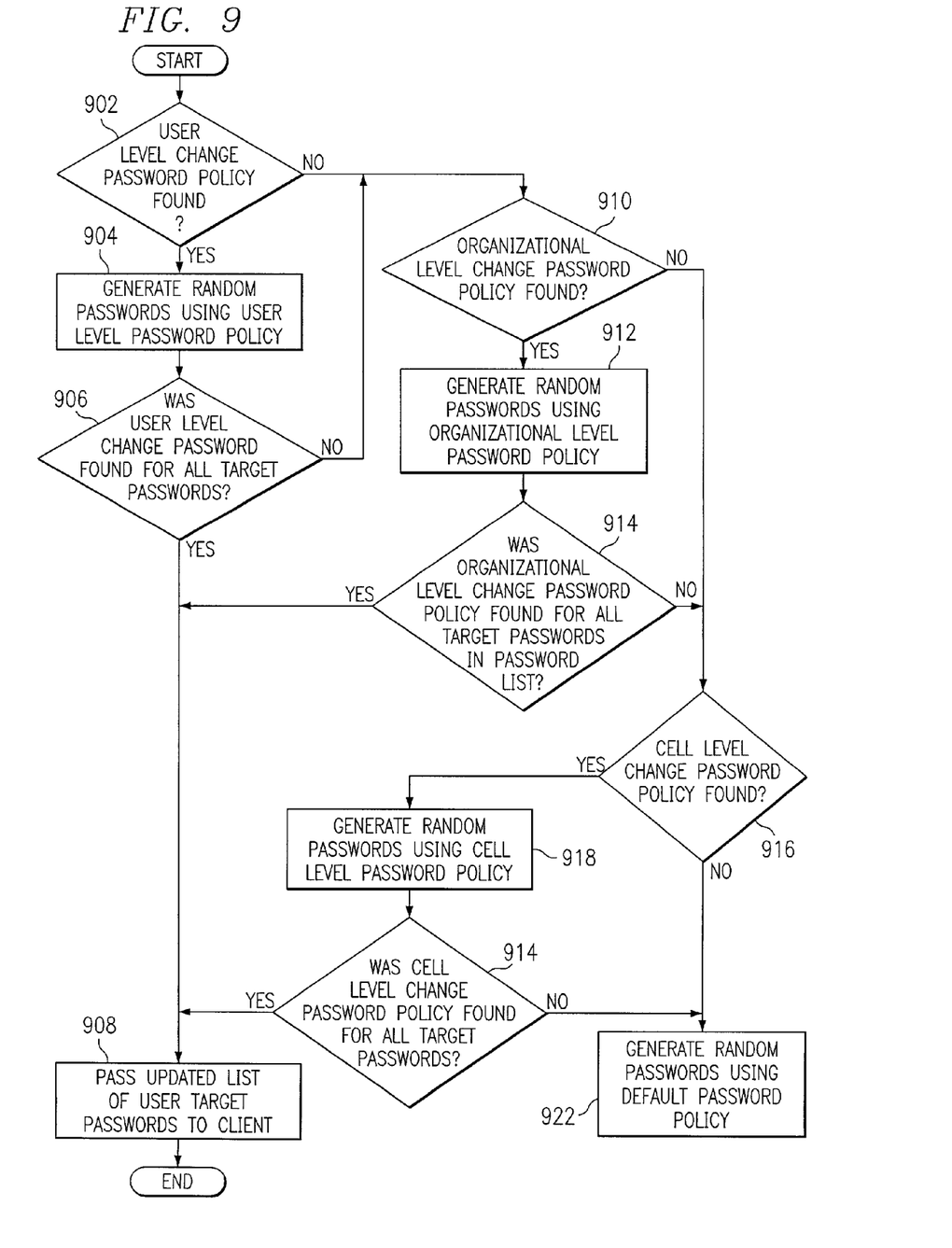
FIG. 9 depicts a flowchart illustrating a process of determining the password policy in effect for a set of user target passwords and applying the password policy attributes found to a list of user target passwords by generating random passwords in accordance with a preferred embodiment of the present invention.

FIG. 9 depicts a flowchart illustrating a process of determining the password policy in effect for a set of user target passwords and applying the password policy attributes found to a list of user target passwords by generating random passwords in accordance with a preferred embodiment of the present invention. FIG. 9 is a more detailed view of step 706 in FIG. 7. In this example, the operation begins with a determination as to whether or not a user level change password policy was found (step 902). If a user level change password policy was found (step 902: YES), then random passwords are generated using the user level password policy (step 904). Then a determination is made as to whether or not the user level password policy was found for all target passwords (step 906). If the user level change password policy is not found for all of the target passwords (step 906: NO), then a determination is made as to whether or not an organizational level change password policy is found (step 910). If the user level change password policy was found for all target passwords (step 906: YES), then the updated list of user target passwords is passed to the client (step 908) and thereafter the operation terminates.

Whether a user level change policy is not found (step 902: NO) or the user level change password policy was not found for all target passwords (step 906: NO), then a determination is made as to whether or not an organizational level change password policy is found (step 910). If an organizational level change password policy is not found (step 910: NO), then a determination is made as to whether or not a cell level change password policy is found (step 916). If an organizational level change password policy is found (step 910: YES), then random passwords are generated using the organizational level password policy (step 912). Then a determination is made as to whether or not the organizational level change password policy was found for all target passwords (step 914). If the organizational level change password policy is not found for all of the target passwords (step 914: NO), then a determination is made as to whether or not a cell level change password policy is found (step 916). If the organizational level change password policy is found for all target passwords (step 914: YES), then the updated list of target passwords is passed to the client (step 908) and thereafter the operation terminates.

Whether an organizational level change password policy is not found (step 910: NO) or the organizational level change password policy was not found for all target passwords (step 914: NO), then a determination is made as to whether or not a cell level change password policy was found (step 916). If a cell level change password policy was not found (step 916: NO), then random passwords are generated using the default password policy (step 922) and thereafter the operation terminates. If a cell level change password policy is found (step 916: YES), then random passwords are generated using the cell level password policy (step 918). Then a determination is made as to whether or not the cell level change password policy was found for all target passwords (step 920). If the cell level password policy was not found for all target passwords (step 920: NO), then random passwords are generated using the default password policy (step 922) and thereafter the operation terminates. If the cell level password policy was found for all of the target passwords (step 920: YES), then the updated list of user target passwords is passed to the client (step 908) and thereafter the operation terminates.

Therefore, the present invention provides for a set of security policies which may be established which allows an administrator to enforce when a user's target password is changed in relationship to when that user's SSO password is changed. When a user wants to change a SSO password, the present invention allows the user to change all of the user's target passwords with a single operation. In addition, administrators may specify a security policy in which the administrator may control when a target password may be changed, as well as what the content of the changed target password should be in relation to the original SSO password. Therefore, the present invention provides a flexible scheme for changing SSO target passwords and a method that supports this scheme in the existing SSO architecture.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communication links.

This embodiment was chosen and described in order to best explain the principles of the invention, the practical application, and to enable others of ordinary skill in the art to understand the invention for various embodiments with various modifications as are suited to the particular use contemplated. Moreover, the techniques described are also applicable to any other systems or applications which need to manage confidential passwords.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

What is claimed is:

1. A method in a data processing system for changing a plurality of target passwords in a single sign-on environment, comprising the steps of:
   in response to receiving a change instruction identifying a first single sign-on password, changing the first single sign-on password to create a second single sign-on password;
   retrieving a target password; and
   modifying the target password in a user selected manner to match the second single sign-on password to create a modified target password.

2. The method as recited in claim 1, further comprising:
   storing the modified target password;
   responsive to a request from a user requesting access to an application, retrieving the modified target password; and
   providing the changed target password to the requested application.

3. The method of claim 1, further comprising:
   transmitting the modified target password to a client.

4. The method as recited in claim 2, wherein the requested application is located at a client.

5. The method of claim 1, wherein the user is prompted to modify the target password from a menu of possible target password modification methods.

6. The method in claim 5, wherein one of the possible target password modification methods is a common password source.

7. The method of claim 6, wherein the common password source is the second single sign-on password.

8. The method of claim 5, wherein one of the possible target password modification methods is a user supplied source.

9. The method of claim 5, wherein one of the possible target password modification methods is a random supplied source.

10. The method of claim 9, wherein the random supplied source is from a server.

11. The method of claim 9, further comprising:
determining a password policy; and
applying the password policy to generate random passwords.

12. The method of claim 11, wherein the password policy is a user level password policy.

13. The method of claim 11, wherein the password policy is an organizational level password policy.

14. The method of claim 11, wherein the password policy is a cell level password policy.

15. The method of claim 5, wherein the menu of possible target password modification methods is in a graphical user interface.

16. The method of claim 1, further comprising:
responsive to a determination that a target password has been retrieved:
determining a change target password policy; and
applying the change target password policy to modify the target password to match the second single sign-on password to create the modified target password.

17. The method of claim 16, wherein the change target password policy is applied at a user level.

18. The method of claim 16, wherein the change target password policy is applied at an organizational level.

19. The method of claim 16, wherein the change target password policy is applied at a cell level.

20. A computer program product in a computer storage medium having a first computer readable program for use in a data processing system for changing a plurality of target passwords in a single sign-on environment, the computer program product comprising:
first instructions for, in response to receiving a change instruction identifying a first single sign-on password, changing the first single sign-on password to create a second single sign-on password;
second instructions for retrieving a target password; and
third instructions for modifying the target password in a user selected manner to match the second single sign-on password to create a modified target password.

21. The computer program product of claim 20, further comprising:
fourth instructions storing the modified target password;
fifth instructions, responsive to a request from a user requesting access to an application, for retrieving the modified target password; and
sixth instructions, responsive to the fifth instructions, for providing the modified target password to the requested application.

22. The computer program product as recited in claim 21, wherein the requested application is located at a client.

23. The computer program product as recited in claim 20, further comprising:
fourth instructions for transmitting the modified target password to a client.

24. The computer program product as recited in claim 20, wherein the user is prompted to modify the target password from a menu of possible target password modification methods.

25. The computer program product as recited in claim 24, wherein one of the possible target password modification methods is a common password source.

26. The computer program product as recited in claim 25, wherein the common password source is the second single sign-on password.

27. The computer program product as recited in claim 24, wherein one of the possible target password modification methods is a user supplied source.

28. The computer program product as recited in claim 24, wherein one of the possible target password modification methods is a random supplied source.

29. The computer program product as recited in claim 28, wherein the random supplied source is from a server.

30. The computer program product as recited in claim 28, further comprising:
fourth instructions for determining a password policy; and
fifth instructions, responsive to the fourth instructions, for applying the password policy to generate random passwords.

31. The computer program product as recited in claim 30, wherein the password policy is a user level password policy.

32. The computer program product as recited in claim 30, wherein the password policy is an organizational password policy.

33. The computer program product as recited in claim 30, wherein the password policy cell level password policy.

34. The computer program product as recited in claim 24, wherein the menu of possible target password modification methods is in a graphical user interface.

35. The computer program product as recited in claim 20, further comprising:
fourth instructions for, responsive to a determination that a target password has been retrieved, determining a change target password policy; and
fifth instructions for, responsive to the fourth instructions, applying the change target password policy to modify the target password to match the second single sign-on password to create the modified target password.

36. The computer program product as recited in claim 35, wherein the change target password policy is applied at a user level.

37. The computer program product as recited in claim 35, wherein the change target password policy is applied at an organizational level.

38. The computer program product as recited in claim 35, wherein the change target password policy is applied at a cell level.

39. The computer program product of claim 20, wherein the computer storage medium further comprises a second computer readable program, wherein the second computer readable program when executed on a computer causes the computer to transmit the first computer readable program over a communication link.

40. The computer program product of claim 20, wherein the first computer readable program is transmitted over a communication link.

41. A system for changing a target password in a single sign-on environment, comprising:

in response to receiving a change instruction identifying a first single sign-on password, means for changing the first single sign-on password to create a second single sign-on password;

means for retrieving a target password; and means for modifying the target password in a user selected manner to match the second single sign-on password to create a modified target password.

42. The system as recited in claim 41, further comprising:

means for storing the modified target password;

responsive to a request from a user requesting access to an application, means for retrieving the modified target password; and means for providing the modified target password to the requested application.

43. The system as recited in claim 42, wherein the requested application is located at a client.

44. The system as recited in claim 41, further comprising: transmitting the modified target password to a client.

45. The system as recited in claim 41, wherein the user is prompted to modify the target password from a menu of possible target password modification methods.

46. The system as recited in claim 45, wherein one of the possible target password modification methods is a common password source.

47. The system as recited in claim 46, wherein the common password source is the second single sign-on password.

48. The system as recited in claim 45, wherein one of the possible target password modification methods is a user supplied source.

49. The system as recited in claim 45, wherein one of the possible target password modification methods is a random supplied source.

50. The system as recited in claim 49, wherein the random supplied source is from a server.

51. The system as recited in claim 49 further comprising: means for determining a password policy; and means for applying the password policy to generate random passwords.

52. The system as recited in claim 51, wherein the password policy is a user level password policy.

53. The system as recited in claim 51, wherein the password policy is an organizational level password policy.

54. The system as recited in claim 51, wherein the password policy is a cell level password policy.

55. The system as recited in claim 45, wherein the menu of possible target password modification methods is in a graphical user interface.

56. The system as recited in claim 41, further comprising:

responsive to a determination that a target password has been retrieved, means for determining a change target password policy; and responsive to the means for determining a change target password policy, means for applying the change target password policy to modify the target password to match the second single sign-on password to create the modified target password.

57. The system as recited in claim 56, wherein the change target password policy is applied at a user level.

58. The system as recited in claim 56, wherein the change target password policy is applied at an organizational level.

59. The system as recited in claim 56, wherein the change target password policy is applied at a cell level.

* * * * *